United States Patent
Shibahata (10) Patent No.: US 11,435,195 B2
(45) Date of Patent: Sep. 6, 2022

(54) ROUTE GENERATION DEVICE, VEHICLE AND VEHICLE SYSTEM

(71) Applicant: HITACHI ASTEMO, LTD., Ibaraki (JP)

(72) Inventor: Shigeharu Shibahata, Tochigi (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 429 days.

(21) Appl. No.: 16/681,509

(22) Filed: Nov. 12, 2019

(65) Prior Publication Data

US 2020/0124424 A1 Apr. 23, 2020

Related U.S. Application Data

(63) Continuation of application No. PCT/JP2017/024523, filed on Jul. 4, 2017.

(30) Foreign Application Priority Data

Jun. 22, 2017 (JP) .............................. JP2017-122577

(51) Int. Cl.
*G01C 21/34* (2006.01)
*B60W 10/04* (2006.01)
(Continued)

(52) U.S. Cl.
CPC .............. *G01C 21/34* (2013.01); *B60W 10/04* (2013.01); *B60W 10/20* (2013.01); *B60W 10/22* (2013.01);
(Continued)

(58) Field of Classification Search
CPC ... G01C 21/34; G01C 21/3461; B60W 10/04; B60W 10/20; B60W 10/22; B60W 30/18; B60W 2530/10; B60W 2552/30; B60W 2555/20; B60W 2710/20; B60W 2710/22; B60W 2720/106; B60W 60/0011; B60W 60/0013; G08G 1/16
See application file for complete search history.

(56) References Cited

U.S. PATENT DOCUMENTS 9,816,822 B1 * 11/2017 Lalonde ................. G06F 16/29
9,821,801 B2 * 11/2017 Di Cairano ......... B60W 50/087
(Continued)

FOREIGN PATENT DOCUMENTS

JP 11-339184 12/1999
JP 2005-035498 2/2005
(Continued)

OTHER PUBLICATIONS

Office Action for CN Patent Application No. 201780090806.6, dated May 31, 2021, 11 pages.
(Continued)

*Primary Examiner* — Frederick M Brushaber
(74) *Attorney, Agent, or Firm* — Casimir Jones, SC; Robert A. Goetz (57) ABSTRACT

A route generating device configured to generate a route includes a target route generating section (611) configured to generate a target route by connecting an initial location and a destination location through a line including a curve, a curvature of the curve generated by the target route generating section (611) is continuous along the curve.

10 Claims, 7 Drawing Sheets

(51) Int. Cl.
*B60W 10/20* (2006.01)
*B60W 10/22* (2006.01)
*B60W 30/18* (2012.01)
*G08G 1/16* (2006.01)
*B60W 60/00* (2020.01)

(52) U.S. Cl.
CPC ......... *B60W 30/18* (2013.01); *B60W 2530/10* (2013.01); *B60W 2552/30* (2020.02); *B60W 2555/20* (2020.02); *B60W 2710/20* (2013.01); *B60W 2710/22* (2013.01); *B60W 2720/106* (2013.01)

(56) References Cited

U.S. PATENT DOCUMENTS

| | | | | |
|---|---|---|---|---|
| 2007/0192013 | A1* | 8/2007 | Bando | B60T 7/22 701/532 |
| 2009/0240413 | A1* | 9/2009 | Miyajima | B60W 30/18145 701/70 |
| 2009/0265072 | A1* | 10/2009 | Kondou | G08G 1/0968 701/90 |
| 2009/0319126 | A1* | 12/2009 | Miyajima | B60K 31/0066 701/55 |
| 2009/0319138 | A1* | 12/2009 | Kondou | B60W 10/184 701/55 |
| 2009/0319139 | A1* | 12/2009 | Kondou | B60W 30/18136 701/55 |
| 2010/0076640 | A1* | 3/2010 | Maekawa | G05D 1/0217 701/25 |
| 2010/0082215 | A1* | 4/2010 | Miyajima | B60W 30/18009 701/93 |
| 2010/0185384 | A1* | 7/2010 | Naito | G01C 21/26 707/E17.107 |
| 2016/0033294 | A1* | 2/2016 | Sanami | G08G 1/096872 180/65.265 |
| 2016/0375901 | A1 | 12/2016 | Di Cairano | |
| 2020/0124424 | A1* | 4/2020 | Shibahata | B60W 10/20 |
| 2021/0089036 | A1* | 3/2021 | Banzhaf | G05D 1/0212 |

FOREIGN PATENT DOCUMENTS

| | | |
|---|---|---|
| JP | 2005-099930 | 4/2005 |
| JP | 2008-201177 | 9/2008 |
| JP | 2014-026516 | 2/2014 |
| JP | 2017-016645 | 1/2017 |
| JP | 2017-062212 | 3/2017 |
| JP | 2017-102001 | 6/2017 |

OTHER PUBLICATIONS

Office Action for JP Patent Application No. JP2017-122577, dated Jul. 25, 2017, 10 pages.
English Translation of International Preliminary Report on Patentability for PCT/JP2017/024523, dated Jan. 2, 2020, 9 pages.
International Search Report for PCT/JP2017/024523, dated Aug. 1, 2017, 2 pages.

* cited by examiner

ROUTE GENERATION DEVICE, VEHICLE AND VEHICLE SYSTEM

CROSS-REFERENCE TO RELATED APPLICATIONS

This application is a Continuation of PCT International Application No. PCT/JP2017/024523 filed in Japan on Jul. 4, 2017, which claims the benefit of Patent Application No. 2017-122577 filed in Japan on Jun. 22, 2017, the entire contents of which are hereby incorporated by reference.

TECHNICAL FIELD

The present invention relates to (i) a route generating device configured to generate a route, (ii) a vehicle, and (iii) a vehicle system.

BACKGROUND ART

Route generating devices configured to generate a route from an initial location to a destination location are known. In many cases where route generating devices are intended to generate a route on which vehicles run, the route generating devices are applied to autonomous driving techniques. Patent Literature 1 discloses an example of such a route generating device.

CITATION LIST

Patent Literature

[Patent Literature 1]
Japanese Patent Application Publication, Tokukai, No. 2014-26516 (Publication Date: Feb. 6, 2014)

SUMMARY OF INVENTION

Technical Problem

Route generating devices preferably generate routes with good riding comfort.

An object of the present invention is to achieve a route generating device capable of generating routes with good riding comfort.

Solution to Problem

In order to attain the object, a route generating device in accordance with an aspect of the present invention is a route generating device configured to generate a route, including: a target route generating section configured to generate a target route by connecting an initial location and a destination location through a line including a curve, the curve generated by the target route generating section having a segment in which a curvature of the curve changes continuously.

In order to attain the object, a vehicle in accordance with an aspect of the present invention is a vehicle including: a route generating device configured to generate a route, the route generating section including a target route generating section configured to generate a target route by connecting an initial location and a destination location through a line including a curve, the curve generated by the target route generating section having a segment in which a curvature of the curve changes continuously.

In order to attain the object, a vehicle system in accordance with an aspect of the present invention is a vehicle system including: a vehicle; and a server, the server including a route generating section and a transmitting section, the route generating section including a target route generating section configured to generate a target route by connecting an initial location and a destination location through a line including a curve, the curve generated by the target route generating section having a segment in which a curvature of the curve changes continuously, the transmitting section being configured to transmit route information indicating the target route generated by the target route generating section, and the vehicle being configured to control, by referring to the route information transmitted from the transmitting section, at least one of steering, suspension, and vehicle speed.

Advantageous Effects of Invention

With an aspect of the present invention, it is possible to generate routes with good riding comfort.

DESCRIPTION OF EMBODIMENTS

Embodiment 1

The following description will discuss Embodiment 1 of the present invention in detail.

(Configuration of Vehicle 900)

Figure 1:
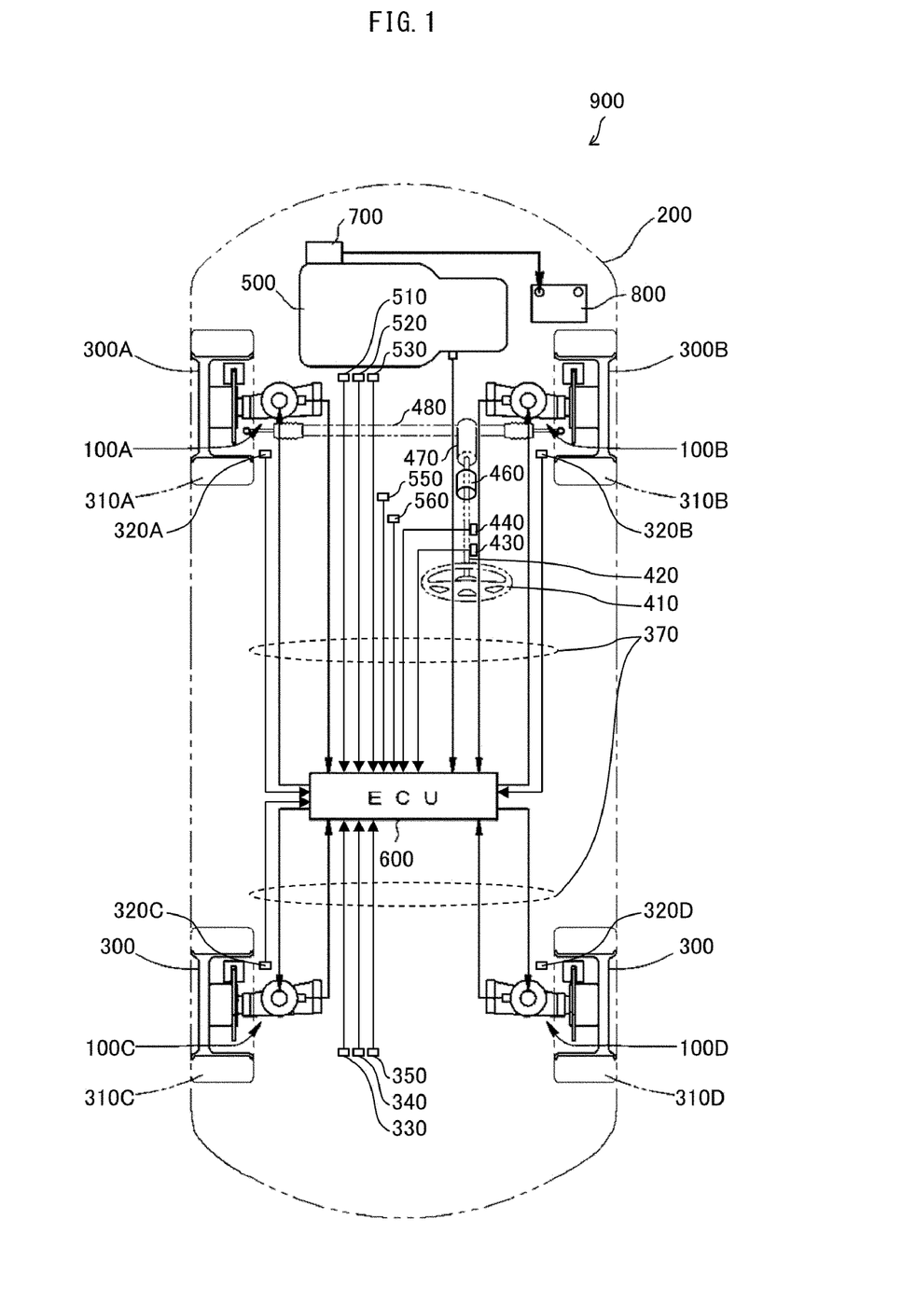
FIG. 1 is a view schematically illustrating a configuration of a vehicle in accordance with Embodiment 1 of the present invention.

FIG. 1 is a view schematically illustrating a configuration of a vehicle 900 in accordance with Embodiment 1. As illustrated in FIG. 1, the vehicle 900 includes a suspension devices (suspensions) 100, a vehicle body 200, wheels 300, tires 310, a steering member 410, a steering shaft 420, a torque sensor 430, a steering angle sensor 440, a torque applying section 460, a rack-and-pinion mechanism 470, a rack shaft 480, an engine 500, an electronic control unit (ECU) (control device) 600, a power generating device 700, and a battery 800.

The wheels 300, on which the tires 310 are mounted, are suspended on the vehicle body 200 by the suspension devices 100. Because the vehicle 900 is a four-wheeled vehicle, there are provided four suspension devices 100, four wheels 300, and four tires 310.

A left front tire and a left front wheel will also be referred to as a tire 310A and a wheel 300A, respectively. A right front tire and a right front wheel will also be referred to as a tire 310B and a wheel 300B, respectively. A left rear tire and a left rear wheel will also be referred to as a tire 310C and a wheel 300C, respectively. A right rear tire and a right rear wheel will also be referred to as a tire 310D and a wheel 300D, respectively. Likewise, configurations associated with the left front wheel, the right front wheel, the left rear wheel, and the right rear wheel will also be expressed with the letters "A", "B", "C", and "D", respectively.

The suspension devices 100 each include a hydraulic buffer, an upper arm, and a lower arm. The hydraulic buffers includes a solenoid valve which is an electromagnetic valve configured to adjust a damping force generated by the hydraulic buffer. Note, however, that Embodiment 1 is not limited to this example. Alternatively, the hydraulic buffer can include an electromagnetic valve other than the solenoid valve as an electromagnetic valve for adjusting the damping force. For example, the hydraulic buffer can include an electromagnetic valve which utilizes an electromagnetic fluid (magnetic fluid).

To the engine 500, the power generating device 700 is provided. An electric power generated by the power generating device 700 is stored in the battery 800. The engine 500 is configured to be able to control an RPM according to vehicle speed controlled variables supplied from the ECU 600.

The steering member 410 to be operated by a driver is connected to one end part of the steering shaft 420 so that a torque can be transmitted from the steering member 410 to the steering shaft 420. The other end part of the steering shaft 420 is connected to the rack-and-pinion mechanism 470.

The rack-and-pinion mechanism 470 is a mechanism configured to convert a rotation around an axis of the steering shaft 420 into a rotation around an axis of the rack shaft 480. The conversion into the rotation around the rack shaft 480 steers the wheel 300A and the wheel 300B via tie rods and knuckle arms.

The torque sensor 430 detects a steering torque applied to the steering shaft 420. In other words, the torque sensor 430 detects a steering torque applied to the steering member 410. Then, the torque sensor 430 supplies, to the ECU 600, a torque sensor signal which indicates a result of the detection. More specifically, the torque sensor 430 detects twisting of a torsion bar provided in the steering shaft 420, and then outputs a result of the detection as a torque sensor signal. Note that the torque sensor 430 can be a well-known sensor such as a hall IC, an MR element, or a magnetostrictive torque sensor.

The steering angle sensor 440 detects a steering angle of the steering member 410, and then supplies a result of the detection to the ECU 600.

The torque applying section 460 applies, to the steering shaft 420, an assist torque or a reaction torque according to steering controlled variables supplied from the ECU 600. The torque applying section 460 includes (i) a motor configured to generate an assist torque or a reaction torque according to the steering controlled variables and (ii) a torque transmission mechanism via which the torque generated by the motor is transmitted to the steering shaft 420.

Concrete examples of "controlled variable" described herein encompass an electric current value, a duty ratio, an attenuation rate, and a damping ratio.

The steering member 410, the steering shaft 420, the torque sensor 430, the steering angle sensor 440, the torque applying section 460, the rack-and-pinion mechanism 470, the rack shaft 480, and the ECU 600 constitute a steering device in accordance with Embodiment 1.

Note that the term "connected . . . so that a torque can be transmitted" used in the above description means one member and the other member are connected so that a rotation of the one member generates a rotation of the other member. For example, the term "connected . . . so that a torque can be transmitted" at least encompasses (i) a case where one member and the other member are integrated, (ii) a case where one member is directly or indirectly fixed to the other member, and (iii) a case where one member and the other member are connected so as to operate in conjunction with each other via a joint member or the like.

The above example discussed the steering device in which the members from the steering member 410 to the rack shaft 480 are constantly and mechanically connected. However, Embodiment 1 is not limited to this example. The steering device in accordance with Embodiment 1 can be, for example, of a steer-by-wire system. Even to the steering device of a steer-by-wire system, the matters described below can be applied.

The vehicle 900 further includes (i) wheel speed sensors 320 which are provided to the respective wheels 300 and are configured to detect wheel speeds of the respective wheels 300, (ii) a horizontal G sensor 330 configured to detect a horizontal acceleration of the vehicle 900, (iii) a front-rear G sensor 340 configured to detect a front-rear acceleration of the vehicle 900, (iv) a yaw rate sensor 350 configured to detect a yaw rate of the vehicle 900, (v) an engine torque sensor 510 configured to detect a torque generated by the engine 500, (vi) an engine RPM sensor 520 configured to detect an RPM of the engine 500, and (vii) a brake pressure sensor 530 configured to detect a pressure applied to a brake fluid of a braking device. Information outputted from these sensors is supplied to the ECU 600 via a controller area network (CAN) 370.

The vehicle 900 further includes (i) a global positioning system (GPS) sensor 550 configured to identify a current position of the vehicle 900 and then output current location information which indicates the current position and (ii) a user input receiving section 560 configured to receive a user input concerning a destination location and then output destination location information which indicates the destination location. The current position information and the destination location information are supplied to the ECU 600 via the CAN 370. The vehicle 900 can further include a route information presenting section configured to visually or audibly present, to a user, a route indicated by route information generated by a route generating section 610 described later.

Although not illustrated, the vehicle 900 further includes the braking device capable of controlling (i) an antilock brake system (ABS) which is a system for preventing the wheels from being locked during breaking, (ii) a traction control system (TCS) for restricting idle running of the wheels during acceleration, and (iii) a vehicle stability assist (VSA) which is a vehicle behavior stabilization control system including an automatic braking function for, for example, yaw moment control and a brake assist function during swirling.

Note that with use of ABS, TCS, and VSA, a comparison is made between (i) a wheel speed determined according to an estimated vehicle body speed and (ii) a wheel speed detected by the wheel speed sensors 320. In a case where the respective values of these wheel speeds differ from each other by a certain amount or more, it is determined that the vehicle is slipping. Through such a process, ABS, TCS, and VSA carry out optimum brake control and optimum traction control according to a running state of the vehicle 900, so as to stabilize the behavior of the vehicle 900.

The braking device of the vehicle 900 is configured to carry out a braking operation according to vehicle speed controlled variables supplied from the ECU 600.

The ECU 600 centrally controls various electronic devices included in the vehicle 900. For example, the ECU 600 adjusts the steering controlled variables to be supplied to the torque applying section 460. This controls a strength of an assist torque or a reaction torque to be applied to the steering shaft 420.

The ECU 600 also controls opening/closing of the solenoid valve of the hydraulic buffer of the suspension devices 100 by supplying suspension controlled variables to the solenoid valve. For enabling such control, there is provided an electric power line which supplies a driving power from the ECU 600 to the solenoid valve.

(ECU 600)

Figure 2:
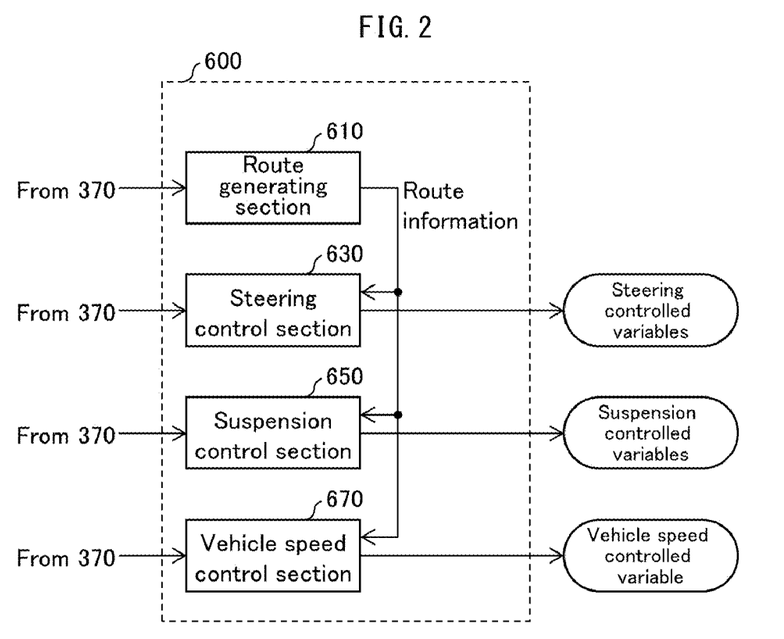
FIG. 2 is a block diagram schematically illustrating a configuration of an ECU in accordance with Embodiment 1 of the present invention.

The ECU 600 will be described in detail below with reference to another drawing. FIG. 2 is a view schematically illustrating a configuration of the ECU 600.

As illustrated in FIG. 2, the ECU 600 includes the route generating section 610, a steering control section 630, a suspension control section 650, and a vehicle speed control section 670.

The route generating section 610 generates route information by referring to current location information and destination location information. The route information thus generated is supplied to at least one of the steering control section 630, the suspension control section 650, and the vehicle speed control section 670.

By referring to at least one of (i) the results of the detections by the various sensors which results are included in the CAN 370 and (ii) the route information supplied from the route generating section 610, the steering control section 630 determines an amount of steering controlled variable to be supplied to the torque applying section 460.

Note that the expression "by referring to" used herein may include such meanings as, for example, "by use of", "in view of", and "depending on".

By referring to at least one of (i) the results of the detections by the various sensors which results are included in the CAN 370 and (ii) the route information supplied from the route generating section 610, the suspension control section 650 determines an amount of suspension controlled variable to be supplied to the solenoid valve of the hydraulic buffer included in the suspension devices 100.

By referring to at least one of (i) the results of the detections by the various sensors which results are included in the CAN 370 and (ii) the route information supplied from the route generating section 610, the vehicle speed control section 670 determines an amount of vehicle speed controlled variable to be supplied to the engine 500 and to the braking device.

Specific steering control, specific suspension control, and specific vehicle speed control, which are carried out by referring to the route information, will described later.

Note that the route generating section 610, the steering control section 630, the suspension control section 650, and the vehicle speed control section 670 can be achieved by respective ECUs. In such a case, the control described herein is achieved by causing the route generating section 610, the steering control section 630, the suspension control section 650, and the vehicle speed control section 670 to communicate with each other via a communication section.

(Route Generating Section)

Figure 3:
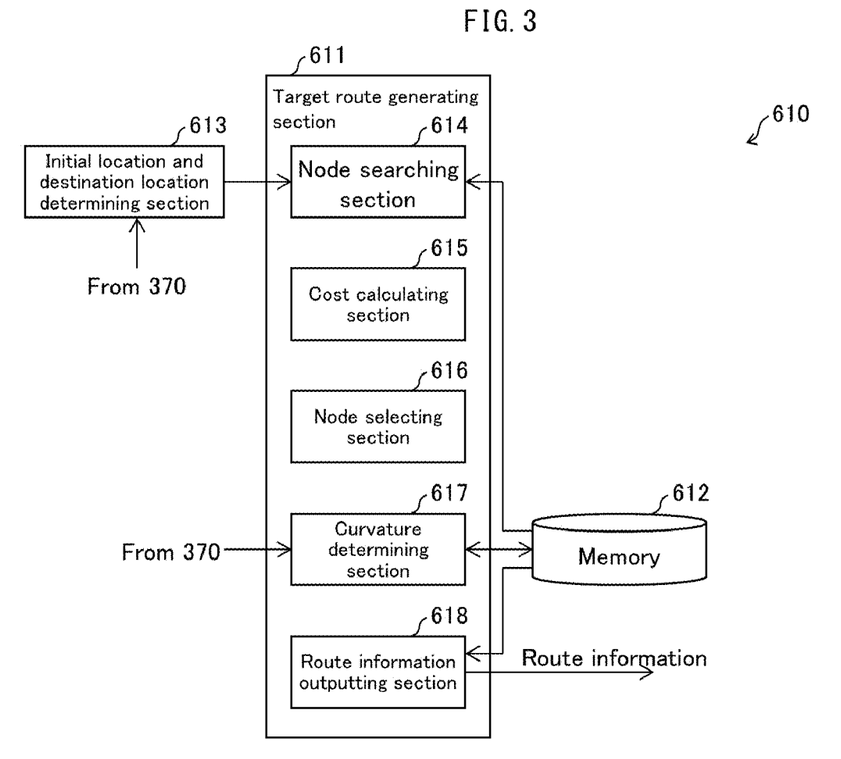
FIG. 3 is a block diagram illustrating a configuration of a route generating section in accordance with Embodiment 1 of the present invention.

The route generating section 610 will be described in more detail next with reference to FIG. 3. FIG. 3 is a block diagram illustrating a configuration of the route generating section 610. As illustrated in FIG. 3, the route generating section 610 includes a target route generating section 611, a memory (storage section) 612, and an initial location and destination location determining section 613. As illustrated in FIG. 3, the target route generating section 611 includes a node searching section 614, a cost calculating section 615, a node selecting section 616, a curvature determining section 617, and a route information outputting section 618.

By referring to current location information and destination location information which are included in the CAN 370, the initial location and destination location determining section 613 determines an initial location and a destination location which serve as a starting point and an ending point of a route search, respectively.

The node searching section 614 obtains map information from the memory 612. The node searching section 614 also obtains, from the initial location and destination location determining section 613, information indicating the initial location and the destination location. By referring to the map information thus obtained, the node searching section 614 searches for a plurality of nodes, one after another, which may be set between the initial location and the destination location determined by the initial location and destination location determining section 613. In other words, the node searching section 614 searches for a plurality of routes from the initial location to the destination location. This can be described as searching for a plurality of nodes or unit lines (described later) defining routes from the initial location to the destination location. A concrete example, in which the node searching section 614 searches for nodes, will be described later.

The cost calculating section 615 calculates respective costs of the plurality of nodes searched by the node searching section 614. A method, by which the cost calculating section 615 calculates a cost, will be described later.

The node selecting section 616 selects, from the plurality of nodes searched for by the node searching section 614, a route which results in a minimum cost among the costs calculated by the cost calculating section 615 is minimum. In other words, the node selecting section 616 selects, from the plurality of routes searched by the node searching section 614, a route which results in a minimum cost. Note that the cost calculating section 615 can stop calculating a cost for any route, among the plurality of routes searched by the node searching section 614, which is determined by the node selecting section 616 as not resulting in a minimum cost.

By smoothly connecting the nodes selected by the node selecting section 616, the curvature determining section 617 determines a route to be outputted. In other words, the curvature determining section 617 determines (i) curvatures of curves included in the route defined by the nodes selected by the node selecting section 616 and (ii) an azimuth of the route at each node. For example, the curvature determining section 617 determines a curvature of each unit line connecting the nodes included in the route selected by the node selecting section 616. In addition, the curvature determining section 617 determines an azimuth of a unit line at each node. Note that the curvatures of a unit line determined by the curvature determining section 617 include curvatures at nodes at both ends of the unit line. In addition, the curvature determining section 617 determines the curvatures of the curves so that the curves include a segment(s) in which curvatures of curves continuously change.

The curvature determining section 617 stores, in the memory 612, curvature information which indicates the curvature of each unit line determined as described above. Note that the curvature information stored in the memory 612 includes information on a curvature at an ending node of the unit line. Furthermore, the curvature information can include curvatures other than the curvature at the ending node of the unit line. Furthermore, the curvature information can include a rate of change in curvature. In addition, the curvature determining section 617 also stores, in the memory 612, (i) an azimuth of a unit line at each node and (ii) coordinate information which indicates a location (coordinates) of each node.

The azimuth and the curvature information on each node, which are stored in the memory 612, are referred to by the curvature determining section 617 in a process of determining an azimuth and a curvature of a unit line having the node as a starting node.

Note that Embodiment 1 is not limited to a timing with which the curvature determining section 617 determines the curvature of each unit line. For example, the curvature determining section 617 can determine the curvature of a unit line each time a unit line is generated. Alternatively, the curvature determining section 617 can determine, after a route from the initial location to the destination location is generated, a curvature of each unit line included in the route thus generated.

By referring to the azimuth, the coordinate information, and the curvature information on each node which are stored in the memory 612, the route information outputting section 618 connects the initial location and the destination location via one or more unit lines. In this way, the route information outputting section 618 generates a target route (also simply referred to as "route"). Then, the route information outputting section 618 outputs route information thus generated.

(Concrete Example of Process by Target Route Generating Section)

A node search process, a cost calculation process, a node selection process, and a curvature determining process carried out by the node searching section 614, the cost calculating section 615, the node selecting section 616, and the curvature determining section 617, which are included in the target route generating section 611, will be described in more detail below with reference to another drawing.

(Node Search Process, Cost Calculation Process, and Node Selection Process)

Figure 4:
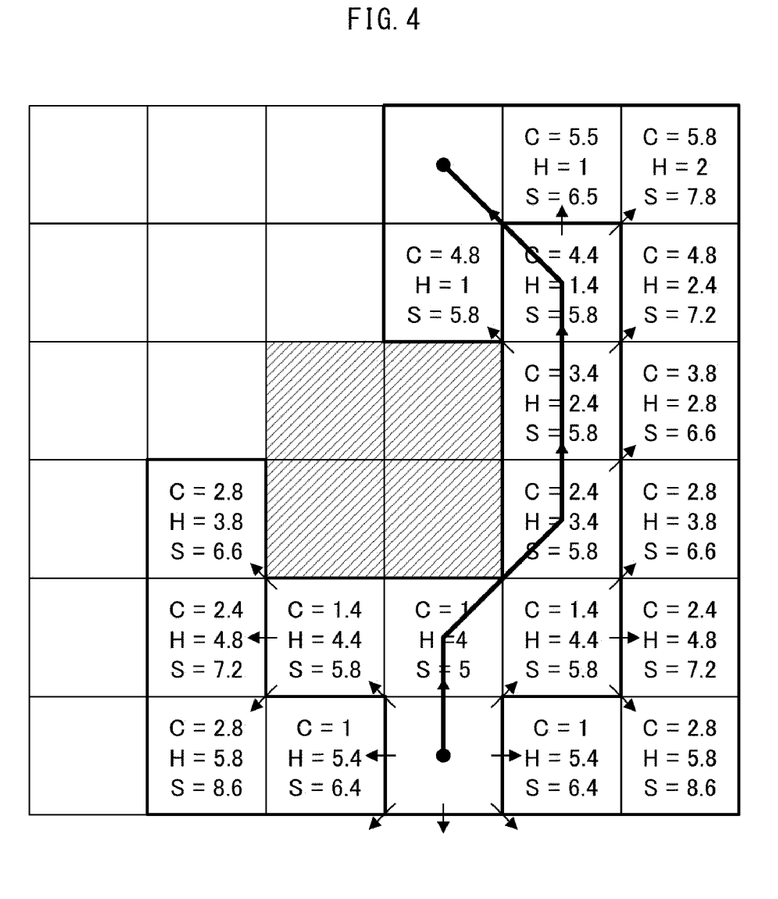
FIG. 4 is an explanatory view schematically illustrating a node search process, a cost calculation process, and a node selection process in route generation in accordance with Embodiment 1 of the present invention.

FIG. 4 is an explanatory view schematically illustrating a node search process, a cost calculation process, and a node selection process.

First, by referring to an initial location and a destination location which are determined by the initial location and destination location determining section 613, the node searching section 614 sets a plurality of cells in a virtual space between the initial location and the destination location as illustrated in FIG. 4.

Then, the node searching section 614 sets, as a starting node, a node corresponding to the initial location. Then, through a process described below, an ending node of a unit line, which uses the starting node as a starting point, is searched for.

First, the node searching section 614 sets any one or more curvatures. Then, the node searching section 614 generates unit lines having the respective curvatures with the starting node serving as a starting point. The node searching section 614 sets, as ending nodes, respective ending points of the unit lines thus generated. Then, the node searching section 614 sets, as candidates of a cell in which to provide an ending node, cells in which the ending nodes are provided. Note that candidates of a cell in which to provide the ending node includes not only cells existing around the cell including the starting node but also cells which are not directly adjacent to the cell including the starting node. Note that the cells existing around the cell including the starting node include (i) cells sharing sides with the cell including the starting node (i.e., cells adjacent, through the sides, to the cell including the starting node) and (ii) cells sharing vertices with the cell including the starting node (i.e., cells adjacent, through the vertices, to the cell including the starting node). In addition, by referring to the map information stored in the memory 612, the node searching section 614 classifies the plurality of cells into (i) cells in which there exist obstacles so that a vehicle 900 cannot run and (ii) cells in which there exist no obstacles so that the vehicle 900 can run (see FIG. 4). Then, the node searching section 614 excludes the cells, in which the vehicle 900 cannot run, from the candidates of a cell in which to provide the ending node. It is possible to exclude, from the candidates of a cell in which to provide the ending node, a cell(s) for which a cost(s) has been calculated.

Then, the cost calculating section 615 calculates a cost (score) S for each of the candidates set by the node searching section 614. Note that the cost S is in general obtained as a sum of (i) an actual cost C which indicates a traveling distance from the node indicative of the initial location to each of nodes searched for and (ii) an estimated cost H which indicates a direct distance from each of the nodes searched for to a node corresponding to the destination location. FIG. 4 illustrates an actual cost C, an estimated cost H, and a cost S in each of a plurality of cells set in a virtual space between the initial location and the destination location. Note that Embodiment 1 is not limited to any method of calculating a direct distance from each of nodes searched for to the destination location. For example, it is possible to use a Euclidean distance or a Manhattan distance.

In a case where a recalculated cost is to be lower than a cost already calculated for a given cell, the cost calculating section 615 updates the cost of the cell with the lower cost.

Then, the node selecting section 616 selects, from the candidates of a cell in which to provide the ending node, a node corresponding to a cell which results in a minimum cost S among the costs S calculated by the cost calculating section 615. Then, the node selecting section 616 provides the ending node in the cell thus selected. Note that in a case where there are a plurality of nodes resulting in an identical cost S, the node selecting section 616 selects, as a next node, a node for which an actual cost C is lowest.

(Curvature Determining Process)

Then, the curvature determining process of determining each unit line carried out by the curvature determining section 617 will be described in detail with reference to FIGS. 5 and 6.

<Example Process 1>

Figure 5:
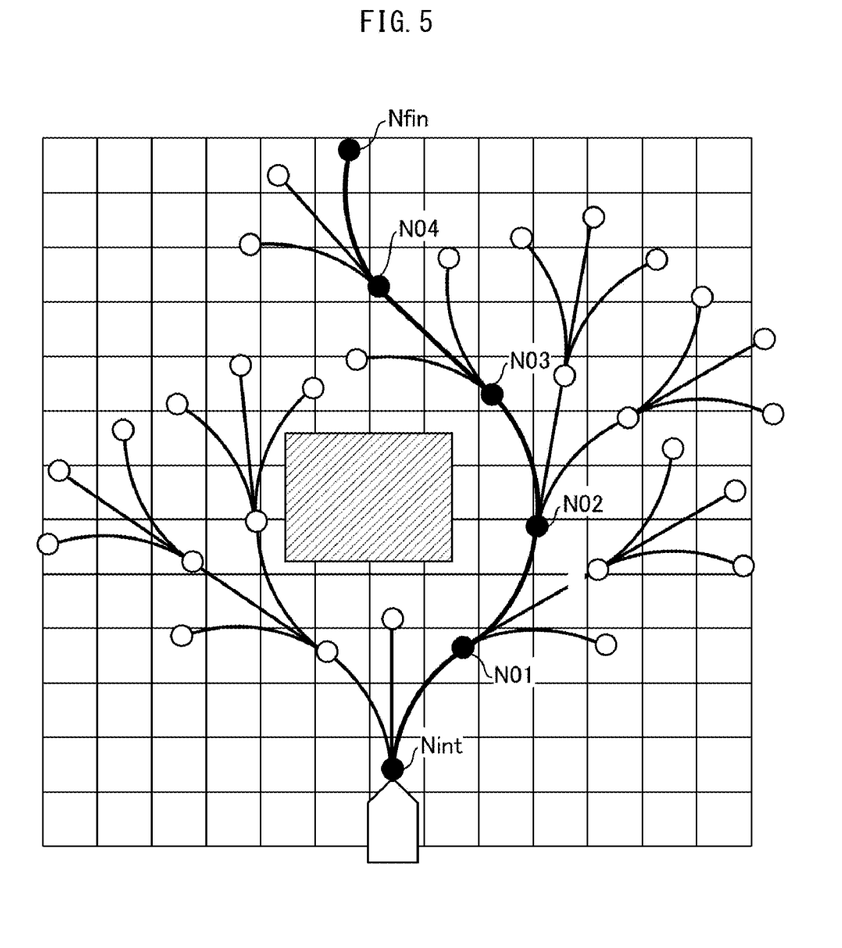
FIG. 5 is a view schematically illustrating a route generated in Example 1 of a route generation process in accordance with Embodiment 1 of the present invention.

FIG. 5 is a view schematically illustrating a route generated in Example Process 1 of the curvature determining process. FIG. 5 illustrates the route which (i) starts from a node Nint corresponding to an initial location, (ii) goes through nodes N01 through N04, and (iii) ends with a node Nfin corresponding to a destination location.

In Example Process 1, the curvature determining section 617 determines a curvature of each unit line by referring to an azimuth of each node stored in the memory 612.

More specifically, first, the curvature determining section 617 obtains, from the memory 612, an azimuth θa of a unit line ULa at a target node Ntarget which serves as an ending node of the unit line ULa. Note that the target node Ntarget means a node to be processed by the curvature determining section 617. In an example shown in FIG. 5, the target node Ntarget corresponds to any of the node Nint and the nodes N01 through N04.

Then, the curvature determining section 617 determines an azimuth θb of a unit line ULb at the target node Ntarget which serves as a starting node of the unit line ULb such that the azimuth θb is equal to the azimuth θa. This determines an orientation of the unit line ULb at the starting node.

Then, the curvature determining section 617 sets a curvature of the unit line ULb to a certain value.

In short, the curvature determining section 617 determines the curvature of the unit line ULb by conditions 1a and 1b below.

(Condition 1a)

The azimuth θb of the unit line ULb at the target node Ntarget (i.e., at the starting node of the unit line ULb) satisfies "θb=θa".

(Condition 1b)

The curvature is constant toward a node following the target node Ntarget (i.e., toward the ending node of the unit line ULb).

In addition, the curvature determining section 617 stores the following in the memory 612:
  an azimuth of the unit line ULb at the ending node of the unit line ULb and
  coordinate information indicating the location (coordinates) of the ending node of the unit line ULb.

According to the curvature determining process in Example Process 1, (i) unit lines are connected so that azimuths at each node are continuous and (ii) the respective curvatures of the unit lines are constant. Therefore, according to the curvature determining process in Example Process 1, a route is generated so that azimuths are continuous along the route.

<Control Example 2>

Then, Example Process 2 of the curvature determining process will be described below with reference to FIG. 6. FIG. 6 is a view schematically illustrating a route generated in Example Process 2 of the curvature determining process. (a) of FIG. 6 illustrates unit lines from a starting node N11 to ending nodes N12, N13, and N14. (b) of FIG. 6 illustrates further unit lines extending to nodes N121 through N143.

In Example Process 2, the curvature determining section 617 determines curvatures of the unit lines by referring to an azimuth and curvature information of each node, which are stored in the memory 612.

More specifically, first, the curvature determining section 617 obtains, from the memory 612, an azimuth θa and a curvature Ra of a unit line ULa at a target node Ntarget which serves as an ending node of the unit line ULa. Note that as in Example Process 1, the target node Ntarget means a node to be processed by the curvature determining section 617. In the examples shown in (a) and (b) of FIG. 6, the target node Ntarget corresponds to any of the nodes N11 through N143.

Then, the curvature determining section 617 determines an azimuth θb of a unit line ULb at the target node Ntarget which serves as a starting node of the unit line ULb such that the azimuth θb is equal to the azimuth θa. This determines an orientation of the unit line ULb at the starting node.

Then, the curvature determining section 617 determines a curvature Rb of the unit line ULb at the target node Ntarget such that the curvature Rb is equal to the curvature Ra. This causes the unit line ULa and the unit line ULb to be connected at the target node Ntarget so that the curvatures are continuous.

Then, the curvature determining section 617 determines curvatures of parts of the unit line ULb, which parts exclude the target node Ntarget, so that a curvature is continuous along the unit line ULb. Note that the term "a curvature is continuous along a unit line" means that (i) the curvature is constant along the unit line (i.e., the curvature does not change) or (ii) the curvature is continuously changing along the unit line.

In short, the curvature determining section 617 determines the curvature of the unit line ULb by conditions 2a through 2c below.

(Condition 2a)

The azimuth θb of the unit line ULb at the target node Ntarget (i.e., at the starting node of the unit line ULb) satisfies "θb=θa".

(Condition 2b)

The curvature Rb of the unit line ULb at the target node Ntarget satisfies "Ra=Rb".

(Condition 2c)

The curvature of the unit line ULb is continuous.

In addition, the curvature determining section 617 stores the following in the memory 612:
  an azimuth of the unit line ULb at the ending node of the unit line ULb,
  a curvature of the unit line ULb at the ending node of the unit line ULb, and
  coordinate information indicating the location (coordinates) of the ending node of the unit line ULb.

Figure 6:
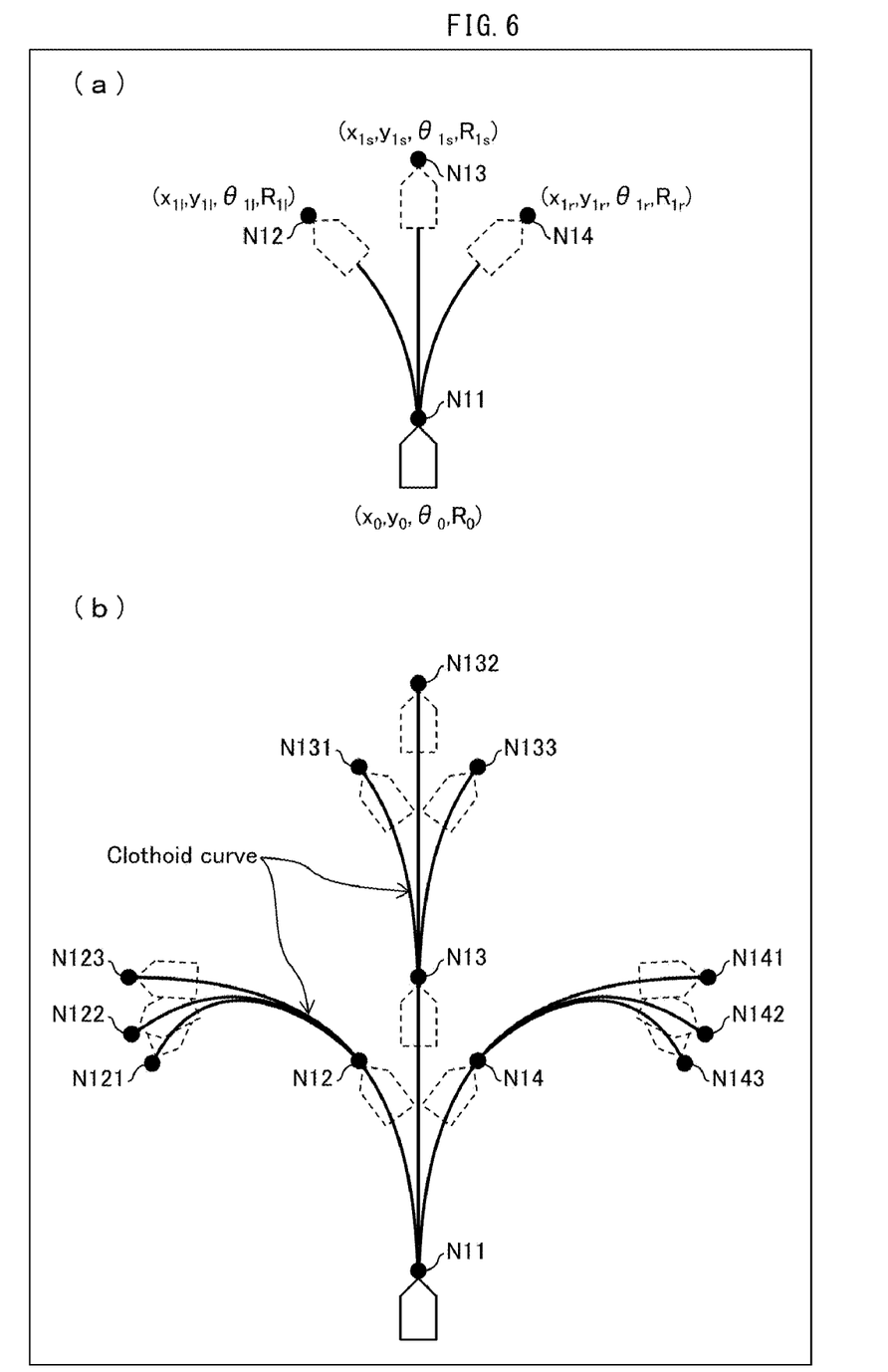
FIG. 6 is a view schematically illustrating a route generated in Example 2 of the route generation process in accordance with Embodiment 1 of the present invention.

(a) of FIG. 6 shows an example in which the following (i) through (iii) are stored in the memory 612: (i) coordinate information (x0, y0) of the node N11, (ii) an azimuth θ0 of a unit line at the node N11 which serves as an ending node of the unit line, and (iii) a curvature R0 of the unit line at the node N11. This likewise applies to the nodes N12, N13, and N14.

According to the curvature determining process in Example Process 2, unit lines are connected so that azimuths at each node are continuous. In addition, since the curvatures are continuous at each node and each unit line, it is possible to restrict sharp steering. With the method of determining curvatures in Example Process 2, it is possible to generate a route with good riding comfort.

According to Example Process 2, alternatively, the curvature determining section 617 can determine the curvature of the unit line ULb by further applying a condition 2d below.

(Condition 2d)

A rate of change in curvature of the unit line ULb along the unit line ULb is constant.

By applying the condition 2d, it is possible to generate a route with good riding comfort. Note that a curve having a constant rate of change in curvature is called a clothoid curve. FIG. 6 shows examples in which the unit lines are clothoid curves.

Alternatively, a curvature of or a rate of change in curvature of the unit line ULb can be determined by the curvature determining section 617 by referring to widths of roads which widths are included in the map information.

Alternatively, the curvature of or the rate of change in curvature of the unit line ULb can be determined by the curvature determining section 617 by referring to at least one of (i) vehicle type information indicating the type of the vehicle 900, (ii) weather information indicating the weather, and (iii) loaded weight information indicating a loaded weight of the vehicle 900.

For example, in a case where a weather indicated by the weather information is a rainy weather, the curvature of or the rate of change in curvature of the unit line ULb can be set to a smaller value than in a case of a fine weather. Alternatively, in a case where a loaded weight indicated by the loaded weight information is larger, the curvature of or the rate of change in curvature of the unit line ULb can be set to a smaller value than in a case where the loaded weight is smaller.

(Flow of Route Generation Process)

Figure 7:
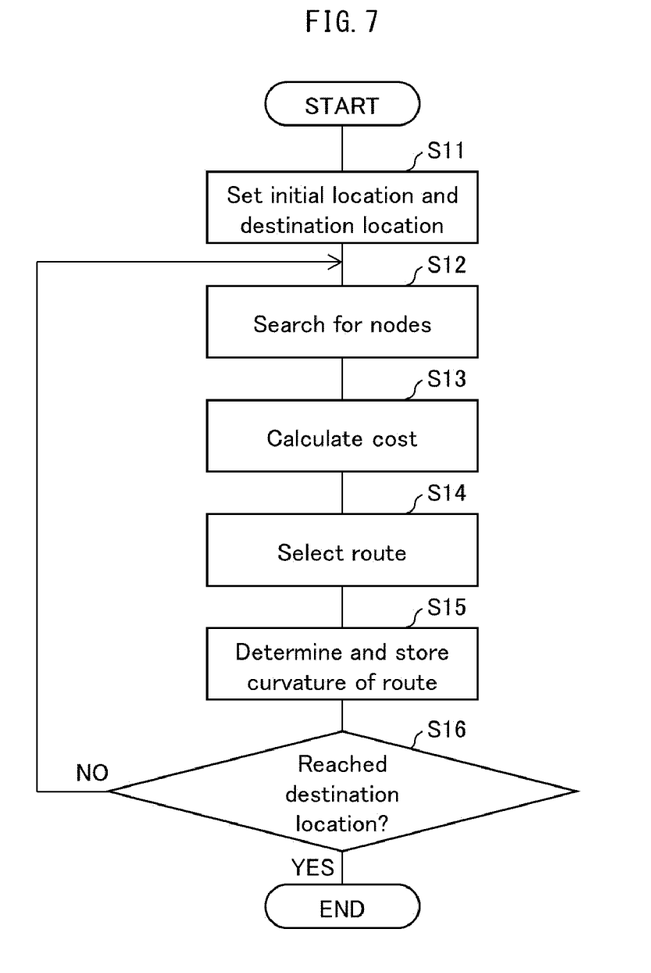
FIG. 7 is a flowchart illustrating a flow of the route generation process in which Embodiment 1 of the present invention.

An example of a flow of a route generation process carried out by the route generating section 610 in accordance with Embodiment 1 will be described below with reference to FIG. 7. FIG. 7 is a flowchart illustrating the flow of the route generation process carried out by the route generating section 610.

The route generating section 610 in accordance with Embodiment 1 generates, by carrying out Steps S11 through S16 described below, a target route connecting an initial location and a destination location.

(Step S11)

First, in Step S11, by referring to current location information and destination location information which are included in the CAN 370, the initial location and destination location determining section 613 determines an initial location and a destination location which serve as a starting point and an ending point of a route search, respectively. Then, the initial location and destination location determining section 613 supplies, to the target route generating section 611, information on the initial location and the destination location thus determined. The node searching section 614 obtains map information from the memory 612. Then, by referring to the initial location, the destination location, and the map information, the node searching section 614 sets a plurality of cells in a space between the initial location and the destination location. Then, the node searching section 614 sets, as a starting node, a node corresponding to the initial location.

(Step S12)

Next, in Step S12, the node searching section 614 sets any one or more curvatures. Then, the node searching section 614 generates unit lines having the respective curvatures with the starting node serving as a starting point. The node searching section 614 sets, as ending nodes, respective ending points of the unit lines thus generated. Then, the node searching section 614 sets, as candidates of a cell in which to provide an ending node, cells in which the ending nodes are provided. Note that the node searching section 614 excludes, from the candidates of a cell in which to provide the ending node, a cell(s) in which there exist(s) an obstacle(s) so that the vehicle 900 cannot run. It is possible to exclude, from the candidates of a cell in which to provide the ending node, a cell(s) for which a cost(s) has been calculated.

(Step S13)

Then, in Step S13, a cost S is calculated for each of the candidate cells set in Step S12. A specific calculation process of calculating the cost S was already described, and there will not be described here.

(Step S14)

Then, the node selecting section 616 selects a node corresponding to a cell which results in a minimum cost S among the costs S calculated in Step S13. Then, the node selecting section 616 provides the ending node in the cell thus selected.

(Step S15)

Then, in Step S15, the curvature determining section 617 determines a curvature of the unit line from the starting node to the ending node. Then, the curvature determining section 617 stores, in the memory 612, (i) curvature information including the curvature at the ending node of the unit line and (ii) an azimuth at the ending node of the unit line. Note that the curvature determining process carried out by the curvature determining section 617 was already described in detail, and therefore will not be described here.

(Step S16)

Then, the target route generating section 611 determines whether or not the route constituted by the unit line thus generated reaches the destination location. In a case where the route does not reach the destination location (NO in Step S16), the ending node is set as a starting node, and the process returns to Step S12. In this case, in Step S12, a cell(s) for which a cost has already been calculated can be excluded from candidate cells to be searched for in a process in which the new starting node serves as a starting point.

In a case where the route constituted by the unit line generated reaches the destination location (YES in Step S16), the route information outputting section 618 refers to the azimuth of each node and the curvature information on each unit line which are stored in the memory 612, so that the route information outputting section 618 generates a target route by connecting the initial location and the destination location by one or more unit lines. Then, the route information outputting section 618 outputs the route information thus generated.

<Vehicle Control by Referring to Route Information>

A concrete example of vehicle control by referring to route information generated by the route generating section 610 will be described below. By referring to route information generated by the route generating section 610, the ECU 600 carries out control as in one of or combination of Control Examples below.

(Control Example 1)

The steering control section 630 identifies a current location of the vehicle 900 by referring to the current location information included in the CAN 370. Then, the steering control section 630 maps the identified current location on a route indicated by the route information generated by the route generating section 610. Then, the steering control section 630 determines steering controlled variables according to a curvature at a location of the route which location is indicated by the route information as corresponding to the current location of the vehicle 900.

For example, the steering control section 630 determines the steering controlled variables so that the curvature of the route is positively correlated to the steering controlled variables.

(Control Example 2)

The suspension control section 650 identifies a current location of the vehicle 900 by referring to the current location information included in the CAN 370. Then, the suspension control section 650 maps the identified current location on a route indicated by the route information generated by the route generating section 610. Then, the suspension control section 650 determines suspension controlled variables according to a curvature at a location of the route which location is indicated by the route information as corresponding to the current location of the vehicle 900.

For example, in a case where there exists a curve at a location of the route which location is indicated by the route information as corresponding to the current location of the vehicle 900, the suspension control section 650 determines the suspension controlled variables so that the suspension for the outer wheels at the curve is hard. In addition, the suspension control section 650 determines the suspension controlled variables so that the curvature of the curve is positively correlated to the suspension controlled variables.

(Control Example 3)

The vehicle speed control section 670 identifies a current location of the vehicle 900 by referring to the current location information included in the CAN 370. Then, the vehicle speed control section 670 maps the identified current location on a route indicated by the route information generated by the route generating section 610. Then, the vehicle speed control section 670 determines vehicle speed controlled variables according to a curvature at a location of the route which location is indicated by the route information as corresponding to the current location of the vehicle 900.

In a case where there exists, in a traveling direction, a curve ahead of the location of the route which location is indicated by the route information as corresponding to the current location of the vehicle 900, it is possible to determine the vehicle speed controlled variables according to (i) a distance between the location and the curve and (ii) a curvature of the curve.

For example, the vehicle speed control section 670 determines the vehicle speed controlled variables so that a larger curvature of the curve ahead in the traveling direction leads to a reduction in vehicle speed. In addition, the vehicle speed control section 670 determines the vehicle speed controlled variables so that a closer distance to the curve ahead in the traveling direction leads to a greater reduction in vehicle speed.

(Control Example 4)

The ECU 600 identifies a current location of the vehicle 900 by referring to the current location information included in the CAN 370. Then, the ECU 600 maps the identified current location on a route indicated by the route information generated by the route generating section 610. Then, the ECU 600 presents, to a driver, warning information according to a curvature at a location of the route which location is indicated by the route information as corresponding to the current location of the vehicle 900.

For example, in a case where the curvature of the route is larger than a certain value, the ECU 600 warns the driver by use of a sound or an image through a speaker or a display panel included in the vehicle 900.

<Additional Matters Concerning Route Generation Process>

The ECU 600 including the route generating section 610 described above can be suitably used in a case where (i) a route of approximately several nodes is generated in advance and then (ii) the vehicle 900 is controlled along the route thus generated. Furthermore, the route generating section 610 can carry out a route generation process in which a greater amount of real-time operation is involved.

For example, the route generating section 610 obtains, from the CAN 370 in real time, steering information concerning a steering angle of the steering member 410, and applies the steering information to generation of a route. More specifically, as curvature information on an ending node of each unit line, the route generating section 610 stores, in the memory 612, steering information concerning a steering angle of the steering member 410 at the ending node. Then, by referring to the steering information, the route generating section 610 generates a route so that steering angles are continuous at each node and each unit line.

In general, a steering angle corresponds to a curvature. Therefore, by referring to a steering angle of the steering member 410 as curvature information on a node, it is possible to determine a curvature of a unit line, which starts at the node as a starting node, so that the steering angle is continuous. In other words, a steering angle of the steering member 410 as curvature information on each node is referred to and is then applied to the route generation process described above. This makes it possible to carry out a route generation process in which a greater amount of real-time operation is involved.

Alternatively, the route generating section 610 in accordance with Embodiment 1 can be configured to (i) obtain vehicle speed information indicating a vehicle speed and then (ii) determine a curvature of each unit line according to the vehicle speed. For example, in a case where a vehicle speed is greater, the route generating section 610 can cause a curvature of each unit line to be smaller.

Embodiment 2

Figure 8:
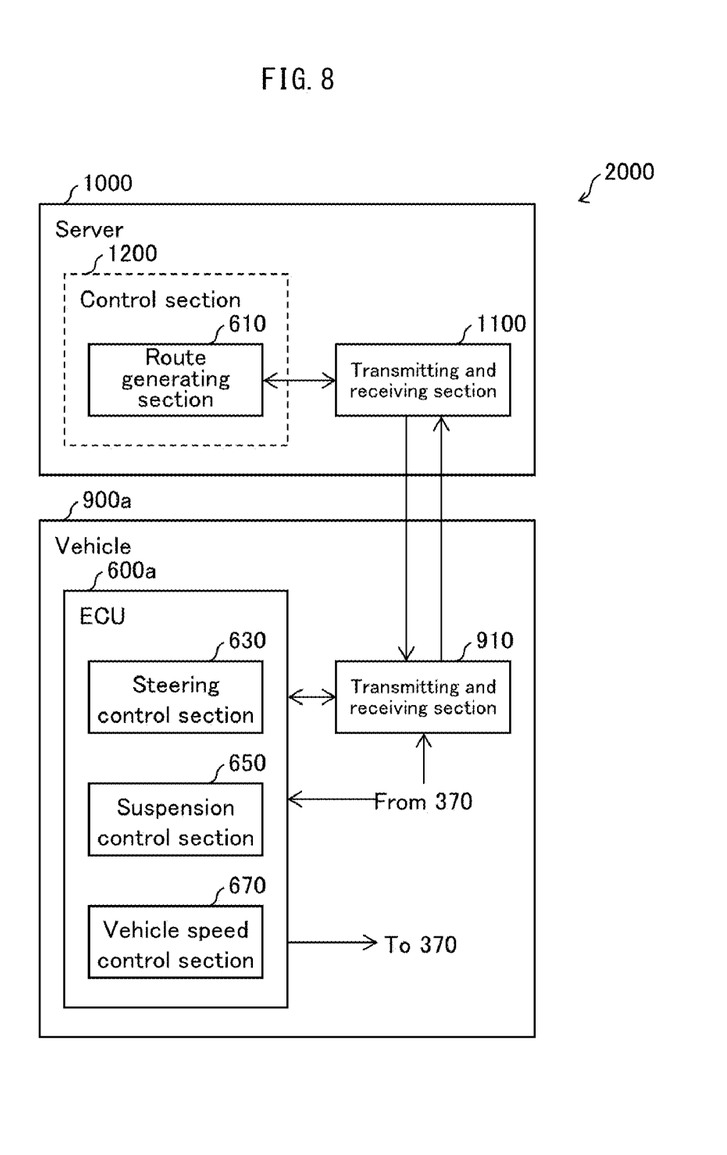
FIG. 8 is a block diagram schematically illustrating a configuration of a vehicle system in accordance with Embodiment 2 of the present invention.

The following description will discuss Embodiment 2 of the present invention in detail with reference to another drawing. In the following description, members which were described in Embodiment 1 will not be described. The points which differ from Embodiment 1 will be described below.

FIG. 8 is a view illustrating a main configuration of a vehicle system 2000 in accordance with Embodiment 2. As illustrated in FIG. 8, the vehicle system 2000 includes a vehicle 900 and a server 1000.

The vehicle 900 in accordance with Embodiment 2 includes an ECU 600a instead of including the ECU 600 included in the vehicle 900 in accordance with Embodiment 1. The vehicle 900 in accordance with Embodiment 2 further includes a transmitting and receiving section 910. The ECU 600a is configured as with the ECU 600 of Embodiment 1 except that the ECU 600a does not include the route generating section 610.

Meanwhile, the server 1000 includes (i) a control section 1200 including a route generating section 610 and (ii) a transmitting and receiving section 1100.

The vehicle 900a supplies, to the transmitting and receiving section 910 via a CAN 370, information on results of detections by various sensors. The transmitting and receiving section 910 supplies the information to the transmitting and receiving section 1100 of the server 1000. The transmitting and receiving section 1100 supplies the information to the route generating section 610. By carrying out a process similar to that described in Embodiment 1, the route generating section 610 generates route information. The route generating section 610 supplies, to the transmitting and receiving section 1100, the route information thus generated. The transmitting and receiving section 1100 supplies the route information to the transmitting and receiving section 910. The transmitting and receiving section 910 supplies the route information to the ECU 610a. As with the ECU 600 in accordance with Embodiment 1, the ECU 600a carries out various controls of the vehicle 900a according to the route information.

[Software Implementation Example]

Control blocks of the ECUs 600 and 600a and the server 1000 (the route generating section 610, the steering control section 630, the suspension control section 650, and the vehicle speed control section 670) can be realized by a logic circuit (hardware) provided in an integrated circuit (IC chip) or the like or can be alternatively realized by software as executed by a central processing unit (CPU).

In the latter case, the ECUs 600 and 600a and the server 1000 each include a CPU that executes instructions of a program that is software realizing the foregoing functions; a read only memory (ROM) or a storage device (each referred to as "storage medium") in which the program and various kinds of data are stored so as to be readable by a computer (or a CPU); and a random access memory (RAM) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be made available to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

- 200 Vehicle body
- 600 ECU (control device)
- 610 Route generating section
- 611 Target route generating section
- 612 Memory
- 613 Initial location and destination location determining section
- 614 Node searching section
- 615 Cost calculating section
- 616 Node selecting section
- 617 Curvature determining section
- 630 Steering control section
- 650 Suspension control section
- 670 Vehicle speed control section
- 900 Vehicle

The invention claimed is:

1. A route generating device configured to generate a route, comprising processing circuitry and a memory, wherein the processing circuitry includes:
    target route generating circuitry configured to generate a target route by connecting an initial location and a destination location through a line including a curve,
    the curve generated by the target route generating circuitry having a first segment in which a curvature of the curve changes continuously,
    the target route generating circuitry being configured to generate the target route by connecting the initial location and the destination location through a plurality of unit lines,
    the curve generated by the target route generating circuitry including a second segment in which a rate of change in the curvature is constant along the curve,
    the target route generating circuitry being configured to search for a plurality of unit lines defining routes from the initial location to the destination location, and then selects, from a plurality of routes generated by connecting the plurality of unit lines, a route resulting in a cost which is minimum among costs for the plurality of routes,
    the costs used by the target route generating circuitry being each calculated by use of a sum of (i) a traveling distance from the initial location to an ending node of a unit line and (ii) a direct distance from the ending node to the destination location,
    the target route generating circuitry being configured to
        store, in the memory, previous curvature information indicating a previous curvature of a previous unit line and
        determine, by referring to the previous curvature information stored in the memory, current curvature information indicating a current curvature of a current unit line by which the previous unit line is followed,
    the plurality of unit lines including the previous unit line and the current unit line,
    the first segment in which a curvature of the curve changes continuously being a segment in which the current curvature of the current unit line changes continuously from the previous curvature of the previous unit line.

2. The route generating device according to claim 1, wherein
    the target route generating circuitry determines the curvature of the curve for each of the plurality of the unit lines.

3. The route generating device according to claim 2, wherein
    the current curvature information indicating the current curvature includes at least one of the current curvature and steering information.

4. The route generating device according to claim 3, wherein
    the target route generating circuitry determines the current curvature information indicating the current curvature of the current unit line by further referring to at least one of vehicle type information, weather information, and loaded weight information.

5. The route generating device according to claim 2, wherein
    the target route generating circuitry determines the current curvature information indicating the current curvature of the current unit line by further referring to at least one of vehicle type information, weather information, and loaded weight information.

6. The route generating device according to claim 1, wherein
    the current curvature information indicating the current curvature includes at least one of the current curvature and steering information.

7. The route generating device according to claim 6, wherein
    the target route generating circuitry determines the current curvature information indicating the current curvature of the current unit line by further referring to at least one of vehicle type information, weather information, and loaded weight information.

8. The route generating device according to claim 1, wherein
the target route generating circuitry determines the current curvature information indicating the current curvature of the current unit line by further referring to at least one of vehicle type information, weather information, and loaded weight information.

9. A vehicle comprising:
a route generating device configured to generate a route, comprising processing circuitry and a memory, wherein the processing circuitry includes
target route generating circuitry configured to generate a target route by connecting an initial location and a destination location through a line including a curve,
the curve generated by the target route generating circuitry having a first segment in which a curvature of the curve changes continuously,
the target route generating circuitry being configured to generate the target route by connecting the initial location and the destination location through a plurality of unit lines,
the curve generated by the target route generating circuitry including a second segment in which a rate of change in the curvature is constant along the curve,
the target route generating circuitry being configured to search for a plurality of unit lines defining routes from the initial location to the destination location, and then selects, from a plurality of routes generated by connecting the plurality of unit lines, a route resulting in a cost which is minimum among costs for the plurality of routes,
the costs used by the target route generating circuitry being each calculated by use of a sum of (i) a traveling distance from the initial location to an ending node of a unit line and (ii) a direct distance from the ending node to the destination location, and
the target route generating circuitry being configured to
store, in the memory, previous curvature information indicating a previous curvature of a previous unit line and
determine, by referring to the previous curvature information stored in the memory, current curvature information indicating a current curvature of a current unit line by which the previous unit line is followed,
the plurality of unit lines including the previous unit line and the current unit line,
the first segment in which a curvature of the curve changes continuously being a segment in which the current curvature of the current unit line changes continuously from the previous curvature of the previous unit line.

10. A vehicle system comprising:
a vehicle; and
a server,
the server including
route generating circuitry and
transmitting circuitry,
the route generating circuitry including
target route generating circuitry configured to generate a target route by connecting an initial location and a destination location through a line including a curve,
the curve generated by the target route generating circuitry having a first segment in which a curvature of the curve changes continuously,
the target route generating circuitry being configured to generate the target route by connecting the initial location and the destination location through a plurality of unit lines,
the curve generated by the target route generating circuitry including a second segment in which a rate of change in the curvature is constant along the curve,
the target route generating circuitry being configured to search for a plurality of unit lines defining routes from the initial location to the destination location, and then selects, from a plurality of routes generated by connecting the plurality of unit lines, a route resulting in a cost which is minimum among costs for the plurality of routes,
the costs used by the target route generating circuitry being each calculated by use of a sum of (i) a traveling distance from the initial location to an ending node of a unit line and (ii) a direct distance from the ending node to the destination location,
the target route generating circuitry being configured to
store, in the memory, previous curvature information indicating a previous curvature of a previous unit line and
determine, by referring to the previous curvature information stored in the memory, current curvature information indicating a current curvature of a current unit line by which the previous unit line is followed,
the plurality of unit lines including the previous unit line and the current unit line,
the first segment in which a curvature of the curve changes continuously being a segment in which the current curvature of the current unit line changes continuously from the previous curvature of the previous unit line, and
the transmitting circuitry being configured to
transmit route information indicating the target route generated by the target route generating circuitry, and
the vehicle being configured to control, by referring to the route information transmitted from the transmitting circuitry, at least one of steering, suspension, and vehicle speed.

* * * * *